United States Patent [19]

Kanaan et al.

[11] Patent Number: 5,755,448

[45] Date of Patent: May 26, 1998

[54] QUICK RELEASE CHUCK DEVICE

[75] Inventors: Roger J. Kanaan, Easley; Erik G. Han; Edward H. Martin, both of Anderson, all of S.C.

[73] Assignee: Power Tool Holders Incorporated, Wilmington, Del.

[21] Appl. No.: 764,160

[22] Filed: Dec. 13, 1996

Related U.S. Application Data

[63] Continuation of Ser. No. 623,459, Mar. 29, 1996, abandoned, which is a continuation-in-part of Ser. No. 456,184, May 31, 1995, abandoned.

[51] Int. Cl.⁶ .................................................. B23B 31/107
[52] U.S. Cl. .............................. 279/75; 279/82; 279/904
[58] Field of Search ................................. 279/22, 30, 57, 279/74, 75, 82, 904, 905

[56] References Cited

U.S. PATENT DOCUMENTS

| | | |
|---|---|---|
| 1,043,114 | 11/1912 | Kupke . |
| 1,898,726 | 2/1933 | Hess ................................. 279/72 |
| 2,172,070 | 9/1939 | Palmgren . |
| 2,807,473 | 9/1957 | Kiehne . |
| 3,184,020 | 5/1965 | Benson et al. . |
| 3,893,677 | 7/1975 | Smith . |
| 4,252,333 | 2/1981 | Vogel . |
| 4,275,893 | 6/1981 | Bilanceri . |
| 4,305,597 | 12/1981 | McCarty . |
| 4,692,073 | 9/1987 | Martindell . |
| 4,828,277 | 5/1989 | De Bastiani et al. .............. 279/22 |
| 4,900,202 | 2/1990 | Wienhold . |
| 5,299,473 | 4/1994 | Weber et al. ...................... 279/74 |
| 5,301,961 | 4/1994 | Wozar . |
| 5,354,075 | 10/1994 | Marik et al. ...................... 279/72 |
| 5,398,946 | 3/1995 | Quiring . |
| 5,464,229 | 11/1995 | Salpaka ............................ 279/82 |
| 5,577,743 | 11/1996 | Kanaan et al. ................... 279/75 |

FOREIGN PATENT DOCUMENTS 009908  2/1915  United Kingdom .

Primary Examiner—Steven C. Bishop
Attorney, Agent, or Firm—Dority & Manning

[57] ABSTRACT

A quick-change chuck device has a body member having a recess defined therein for receipt of a circular tool shank. The body member includes a number of tapered slots defined therein in communication with the recess. An outer sleeve member is coaxial about the body member and axially movable relative to the body member. An axial spring mechanism is disposed between the sleeve member and the body member so as to bias the sleeve member longitudinally relative to the body member to a biased position. The sleeve member is axially movable against the biasing force of the spring mechanism to a released position. Tapered pins are seated within each tapered slot. The tapered pins contact a pin engaging surface defined on the inner diameter of the outer sleeve and are forced radially inward within the slots so as to extend into the recess in the biased position of the outer sleeve. The pins are movable radially outward within the slots once the outer sleeve is moved to its released position relative to the body member. The outer sleeve can include a polymer sleeve surrounding a cylindrical insert in which an axially extending slit is disposed through the insert and between adjacent pin engaging surfaces.

25 Claims, 8 Drawing Sheets

QUICK RELEASE CHUCK DEVICE

This is a continuation of application Ser. No. 08/623,459, filed Mar. 29, 1996, now abandoned, which is a continuation-in-part of application Serial No. 08/456,184, filed May 31, 1995, now abandoned.

BACKGROUND OF THE INVENTION

The present invention relates to a quick release chuck device utilized for holding power bits or tools to a machine tool, and more particularly to a quick release chuck device which is configurable with a drive spindle and which contains a spring-loaded mechanism for locking in a tool shank radially and axially.

Various devices are known in the art for use on portable stationary routers, laminate trimmers, drywall cutters, etc., for securing or holding power tools or power bits to a spindle of the machine tool. For example, various collet tool holding devices and quick release adapters are known in the art. U.S. Pat. No. 5,301,961 to Wozar describes such a chuck. Likewise, U.S. Pat. No. 4,692,073 to Martindell describes a chuck apparatus for power bits utilizing a spring-biased sleeve disposed about the drive spindle for axially securing the power bit to the chuck apparatus.

Any collet or chuck device utilized for holding a power bit, for example a router bit, to a drive spindle must lock the power bit both axially and radially with respect to the drive spindle. In other words, the power bit cannot rotate relative to the drive spindle or be moved axially in and out relative thereto. This concern is especially important with high speed machine tools, such as routers, both for accuracy and safety considerations. With conventional systems, one relatively simple means for rotationally securing the tool bit consists of defining a hexagonal or other multi-sided profile on the end of the tool bit which fits into a corresponding multi-sided recess formed in the chuck device. With another solution, collet chucks utilize a compressible collet for axially and rotationally holding the tool bit. Collet chucks are useful in that they do not depend on a multi-sided configuration in the tool bit for holding the tool. Thus, any manner of power bits or tool bits having essentially round shank portions may be held by a collet chuck device. However, collet chuck devices do not have the quick-change or quick release capabilities that are desired in many applications. For example, it is highly desirable for portable tools such as routers or laminate trimmers to utilize quick-release chuck devices for relatively quick and easy change out of tool bits. However, with the conventional quick-release devices, the tool shank portions must be multi-sided to fit within corresponding bores defined in the quick-change chuck devices. It would be desirable in the art to have a quick-change chuck device which can be utilized with any manner of tool bit, including tool bits that have essentially round tool shanks, for increasing the versatility and ease of operation of machine tools utilizing such chuck devices.

OBJECTS AND SUMMARY OF THE INVENTION

Therefore a principal object of the present invention is to provide a quick-change chuck device for securing a tool bit or working device to a driven spindle of a machine tool.

A further object of the invention is to provide a versatile quick-change chuck device which is capable of holding tool bits having round tool shanks.

And yet a further object of the present invention is to provide a fast-acting, quick-change chuck device in which a tool bit can be readily inserted and removed without having to align a multi-sided profile of the tool with a multi-sided bore in the device.

Another object of the present invention is to provide a quick-change chuck device that overcomes lock-up of tool bits inside the chuck device.

A further object of the present invention is to provide a quick-change chuck device that provides control over the stress levels involving the tool shank and the gripping components of the chuck device.

Still another object of the present invention is to provide a quick-change chuck device that provides ease of operation and reduced weight of the chuck device.

Yet another object of the present invention is to provide a versatile quick-change chuck device that provides better control over the slip torque of the chuck device.

Additional objects and advantages of the invention will be set forth in part in the description which follows, and in part will be obvious from the description, or may be learned through practice of the invention. The objects and advantages of the invention may be realized and attained by means of the instrumentalities and combinations particularly pointed out in the appended claims.

To achieve the objects and in accordance with the purposes of the invention, a quick-change chuck device is provided comprising a body member having a recess defined therein for receipt of a circular tool shank. The body member further includes a plurality of tapered slots defined therein in communication with the recess. An outer sleeve member is coaxial about the body member and is axially movable relative to the body member. The body member further includes a tapered inner diameter pin engaging surface matching each tapered slot. An axial spring mechanism is disposed relative to the sleeve member and the body member so as to bias the sleeve member longitudinally relative to the body member to a biased position. The sleeve member is axially movable against the biasing force of the spring mechanism to a released position. The quick-change chuck device further includes a tapered pin seated within each of the tapered slots defined in the body member. The tapered pins contact the outer sleeve pin engaging surface and are forced radially inward within the slots in the biased position of the outer sleeve so as to extend into the recess and engage in a line of contact with a round tool shank inserted into the recess. The pins are movable radially outward within the slots once the outer sleeve is moved to its released position.

The body member may preferably comprise a flange surface, with the outer sleeve comprising an oppositely facing seat. The spring mechanism is disposed between the flange and the seat. The outer sleeve member is preferably biased axially rearward relative to the body member by the spring mechanism and comprises an outer circumferential surface which can be grasped by an operator so as to move the outer sleeve member axially forward to its released position. In an alternative embodiment, the outer sleeve member may be biased axially forward relative to the body member and is moved to its released position by an operator grasping the body member and moving the body member axially rearward.

The tapered slots defined in the body member are tapered in the longitudinal direction and further define a longitudinally extending opening into the recess. This opening has dimensions such that a portion of each tapered pin extends into said recess along the entire length of the pin, thus defining a line contact between the pin and a tool shank inserted into the recess. The opening is sized such that the front end or narrowed portion of the tapered pins does not fall through the opening into the recess, thus preventing insertion of a tool shank into the recess. The outer sleeve pin engaging surface is tapered longitudinally to such a degree so as to force the tapered pins uniformly radially inward upon the outer sleeve moving to its biased position such that the portion of the pins defining the line contact moves essentially parallel to a center line access through the recess. The tapered, pin engaging surfaces are preferably formed as longitudinally extending radial grooves defined in the inner diameter surface of the outer sleeve.

The radius of these grooves is uniformly greater than the radius of the tapered pins along the length of the pins such that a ramping section is formed along each side of the tapered pins.

In a further alternative embodiment, adjacent and spaced apart from each inner diameter pin engaging surface of the outer sleeve member, there is disposed an axially extending, elongated slit. Moreover, each such slit can be defined through a cylindrical steel insert that is press is fitted into a polymer sleeve, which is coaxial about the insert. The cylindrical insert is configured to be coaxial about the body member and is axially moveable relative to the body member. The cylindrical insert is provided with a plurality of separate pin engaging surfaces, each one disposed to oppose a separate one of the tapered slots defined in the body member. Each pin engaging surface is longitudinally tapered, and each two pin engaging surfaces are separated by the aforementioned elongated slit, which extends axially forwardly and terminates in a relief opening. The flexibility of the insert is controlled by the radial thickness of the insert, the width of the slit, the length of the slit and the type of steel forming the insert, and in particular the hardness thereof, which is affected by the heat treat quality. When the chuck holds the shank of a tool and the operator causes the outer sleeve and insert to move axially relative to the body member, the pins pressing against the pin engaging surfaces of the insert cause the slits to expand in the circumferential direction, thereby aiding release of the shank of the tool.

Preferably, the device further includes an engagement mechanism for operably connecting the quick-change chuck device to a drive spindle. This engagement mechanism may comprise a female threaded receiving portion at an end of the body member for threaded engagement with a male threaded driving spindle. Alternatively, the body member may comprise a male threaded engaging portion at an end thereof for threaded engagement with a female threaded receiving portion of a driving spindle. In yet another alternative embodiment, the body member may comprise the driving spindle of a tool. And in a still further embodiment, the engagement mechanism may comprise a locking device for locking the body member within a receiving socket of a driving spindle.

The present invention also includes a machine tool which is configured for driving a tool bit. This machine tool comprises a drivable spindle and a quick-change chuck device as described above configured with the spindle. The machine tool may comprise, for example, a router or laminate trimmer. The quick release chuck may be threadedly engaged with the spindle of the machine tool, releasably fitted into a socket of the spindle, formed integral with the spindle.

DESCRIPTION OF THE PREFERRED EMBODIMENTS

Figure 1:
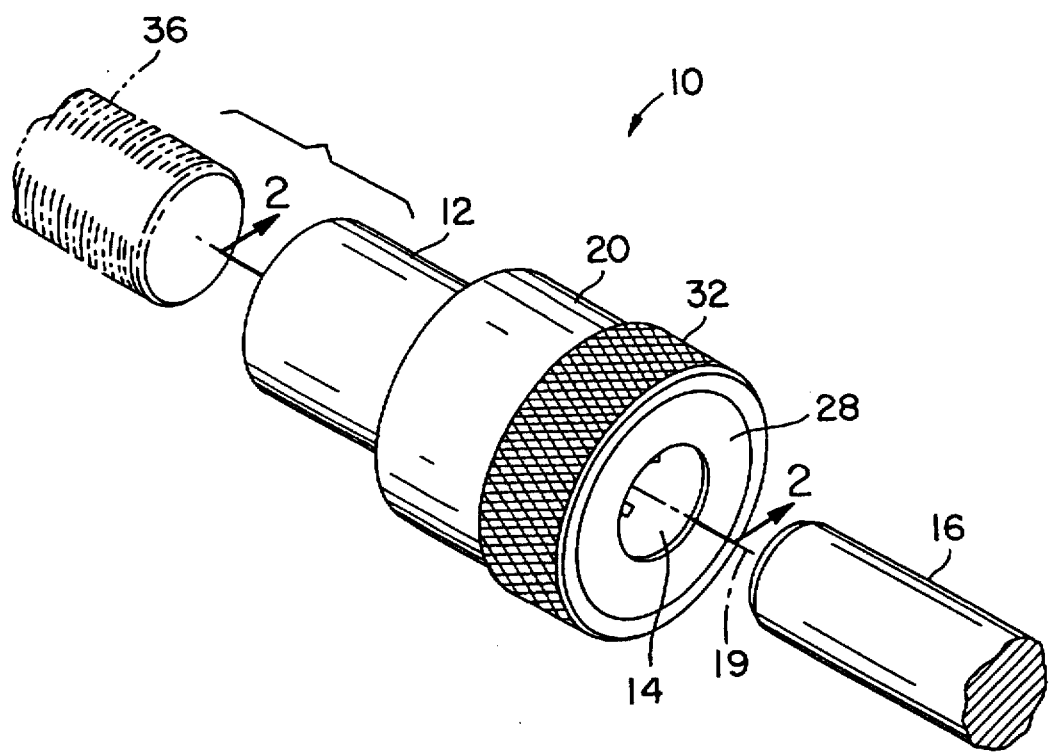
FIG. 1 is a perspective in-line view of the quick-change chuck device according to the invention.

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. The numbering of components in the drawings is consistent throughout the application, with the same components having the same number in each of the drawings.

Figure 5:
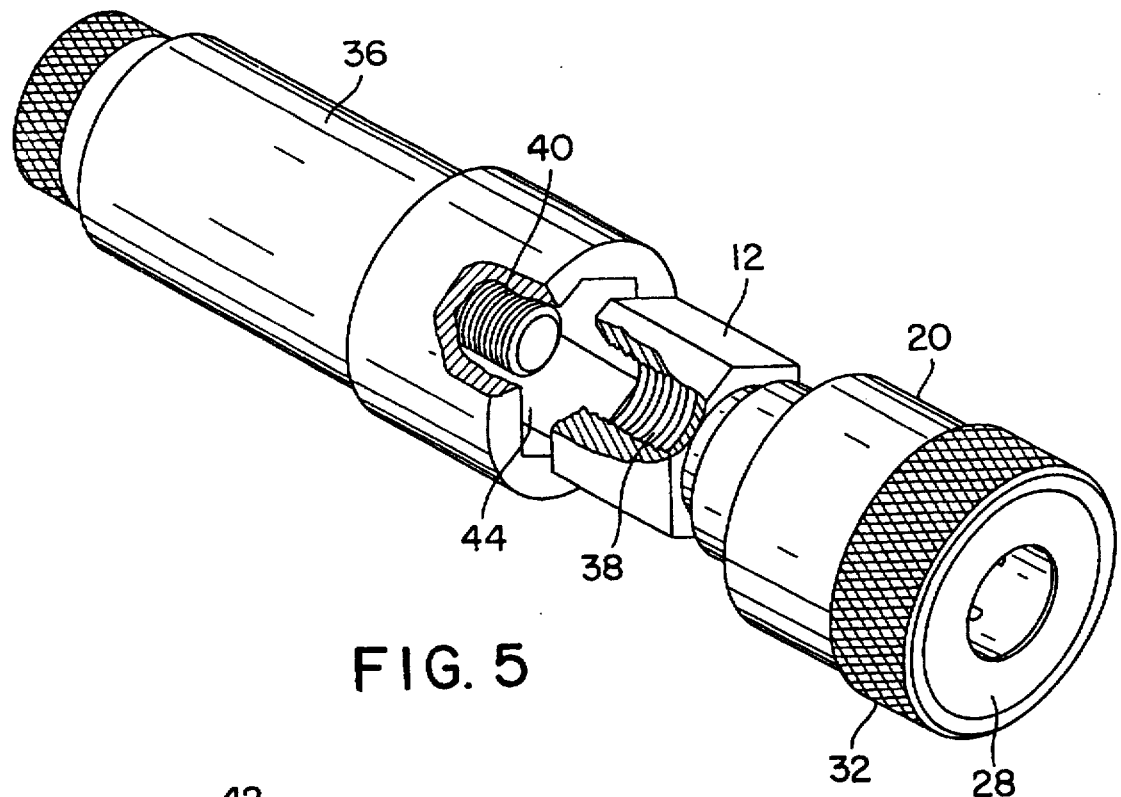
FIG. 5 is a partial cut-away perspective view of the quick-change chuck device according to the invention configured with a drive spindle.
Figure 6:
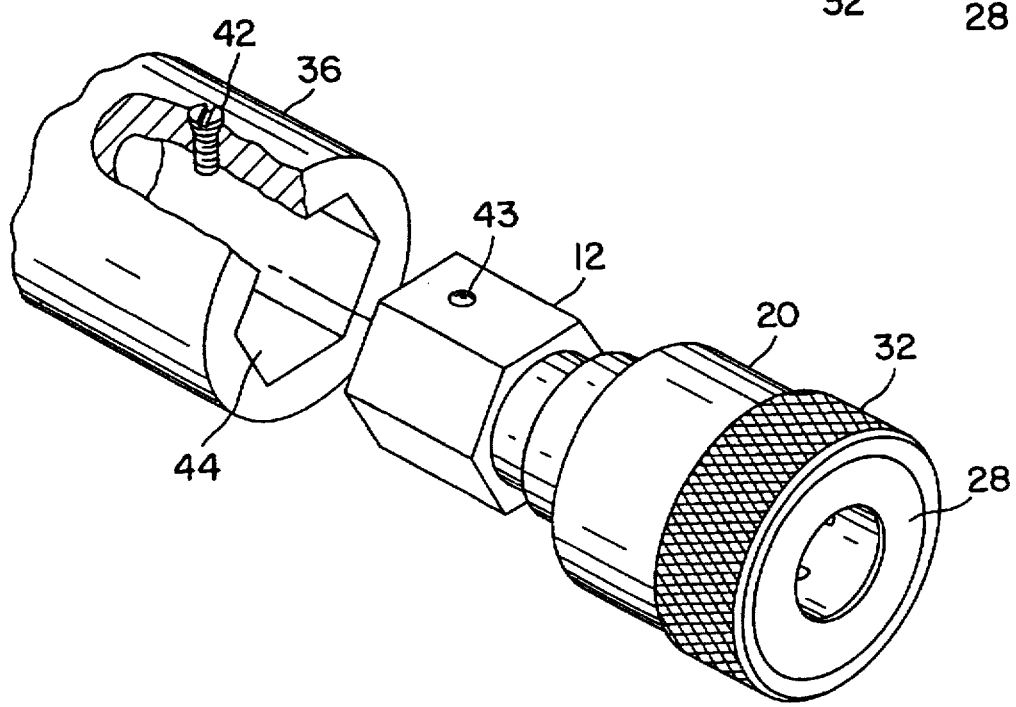
FIG. 6 is an alternative partial cut-away perspective view of another means of engaging the quick-change chuck device to a drive spindle.

Referring to FIGS. 1 through 4 in particular, a quick-change chuck device 10 is provided. Device 10 includes a body member 12. Body member 12 is configured to be driven by a drive spindle 36, particularly seen in FIGS. 5 and 6. Accordingly, various configurations may be utilized to mate device 10 with spindle 36. As shown in FIG. 5 for example, body 12 may comprise a female threaded receiving section or portion 38 defined in the end thereof for engagement with a male threaded portion 40 of drive spindle 36, as particularly shown in FIGS. 2 and 5. Alternatively, body member 12 may comprise a male threaded portion for engagement with a female threaded receiving portion configured in a drive spindle (not shown). And yet in an alternative preferred embodiment, device 10 may be configured as an insert device which is insertable into a receiving socket 44 of a drive spindle 36, as particularly shown in FIG. 6 for example. In this embodiment, device 10 may be held in socket 44 by any conventional means, such as a set screw 42 engaging a recess 43 defined in body member 12. Device 10 may be held in the drive spindle by means of any suitable retaining device.

In yet an alternative embodiment of the invention, body member 12 may be defined in the drive spindle itself. In other words, drive spindle 36 and body member 12 would constitute a unitary structure.

Device 10 also includes an outer sleeve member. One embodiment of the outer sleeve member is designated by the numeral 20 and shown in FIGS. 1–6. An alternative embodiment of the outer sleeve member is designated by the numeral 120 and shown in FIGS. 8–11. Both embodiments have common features, which will be referenced in their respective Figs. by numerals differing by 100.

Figure 2:
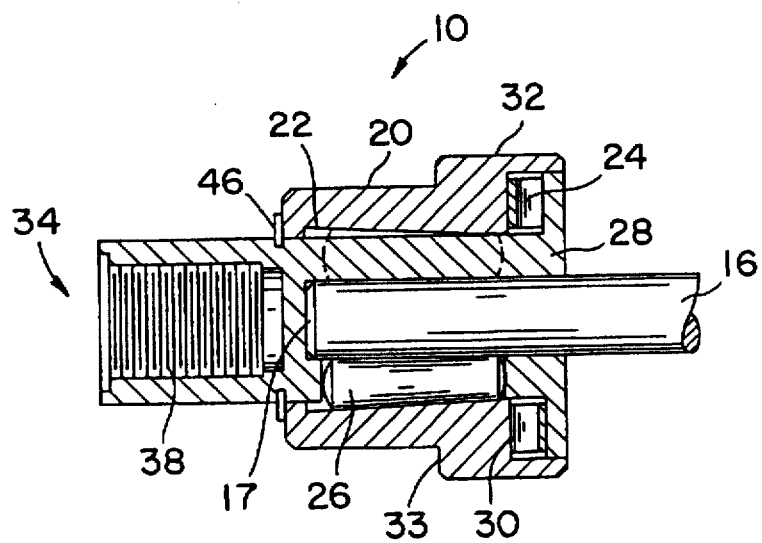
FIG. 2 is a cut-away side view of the device illustrated in FIG. 1 taken along the lines indicated.
Figure 9:
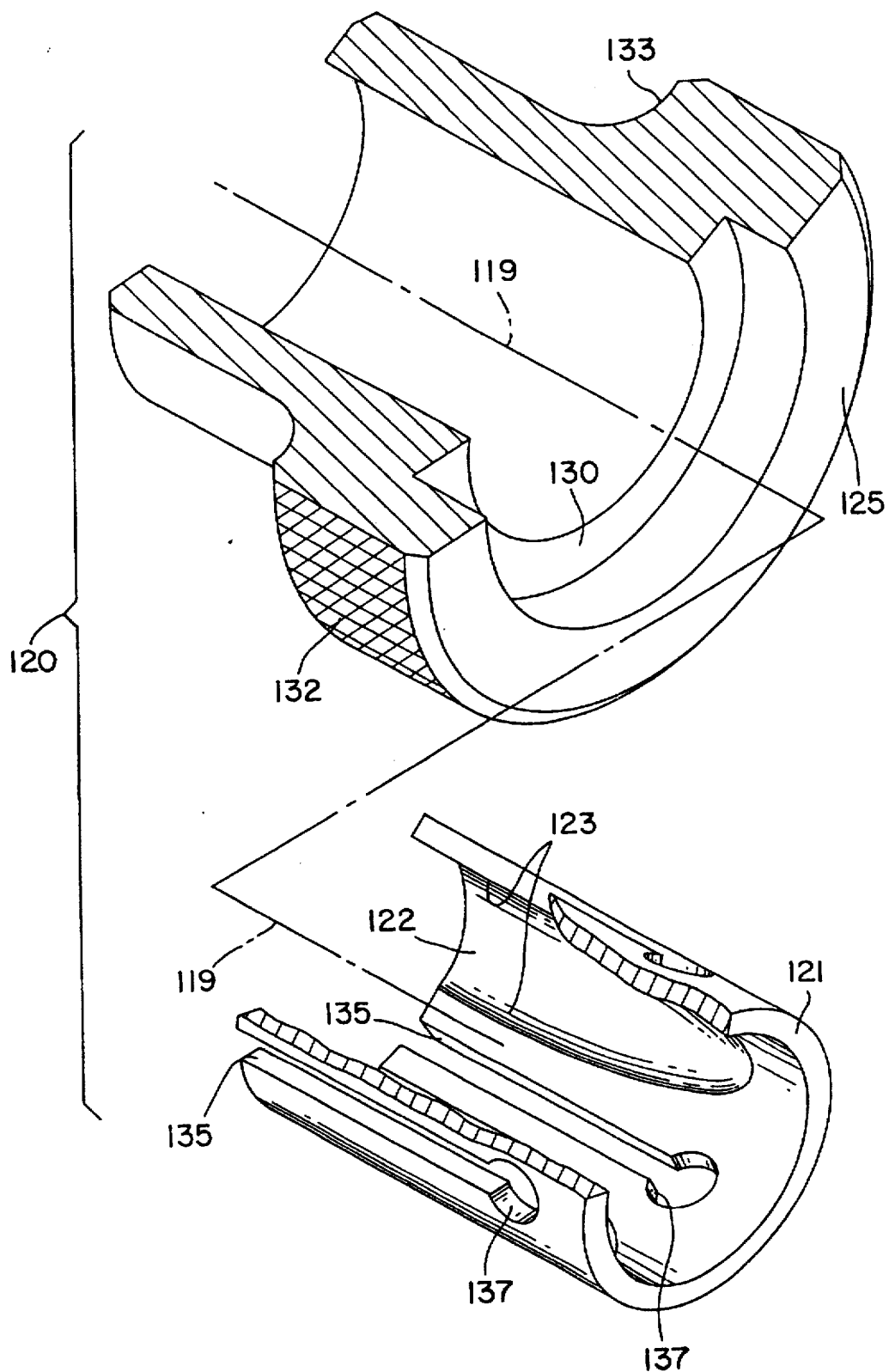
FIG. 9 is an elevated perspective assembly view of the slit sleeve embodiment of FIG. 8, partially in cross-section and partially broken away.

Outer sleeve 20, 120 is coaxial about a forward portion of body member 12. As shown in FIGS. 2 and 9, outer sleeve 20, 120 preferably includes a raised outer circumferential section 33, 133 which can be readily grasped by an operator. In this regard, section 33, 133 also includes a grip-enhancing surface 32, 132, respectively. Outer sleeve 20, 120 is axially movable relative to body member 12 between a biased or locking position as illustrated in FIG. 2 and a released position (not shown). In this regard, an axial spring mechanism 24, such as a spring washer, is operably disposed between body member 12 and outer sleeve 20, 120 (not shown) so as to bias sleeve 20, 120 to its biased position, as illustrated in FIG. 2 for outer sleeve 20.

As shown in FIG. 2, body member 12 may comprise a forward flange 28. A seat surface 30, 130 is formed in outer sleeve 20, 120 and configured and disposed oppositely facing forward flange 28 of body member 12. Axial spring mechanism 24 is disposed between seat 30, 130 and flange 28 and axially forces sleeve member 20, 120 rearward. A retaining clip or member 46 is provided in a corresponding groove 47 (FIG. 3) defined in body member 12 to limit rearward axial movement of sleeve 20, 120.

Sleeve 20, 120 is moved axially forward against the biasing effects of spring 24 by an operator grasping circumferential section 33, 133 and pulling the outer sleeve 20, 120 forward against spring 24.

In the embodiment illustrated in the Figures, outer sleeve 20, 120 is illustrated as biased axially rearward and moveable in the forward direction by the operator. Although not illustrated in the Figures, it is contemplated within the invention that outer sleeve 20, 120 is biased axially forward by spring mechanism 24 and is moved to its released position by an operator grasping surface 32, 132 of outer sleeve 20, 120 and pulling sleeve 20, 120 in the rearward direction.

Figure 3:
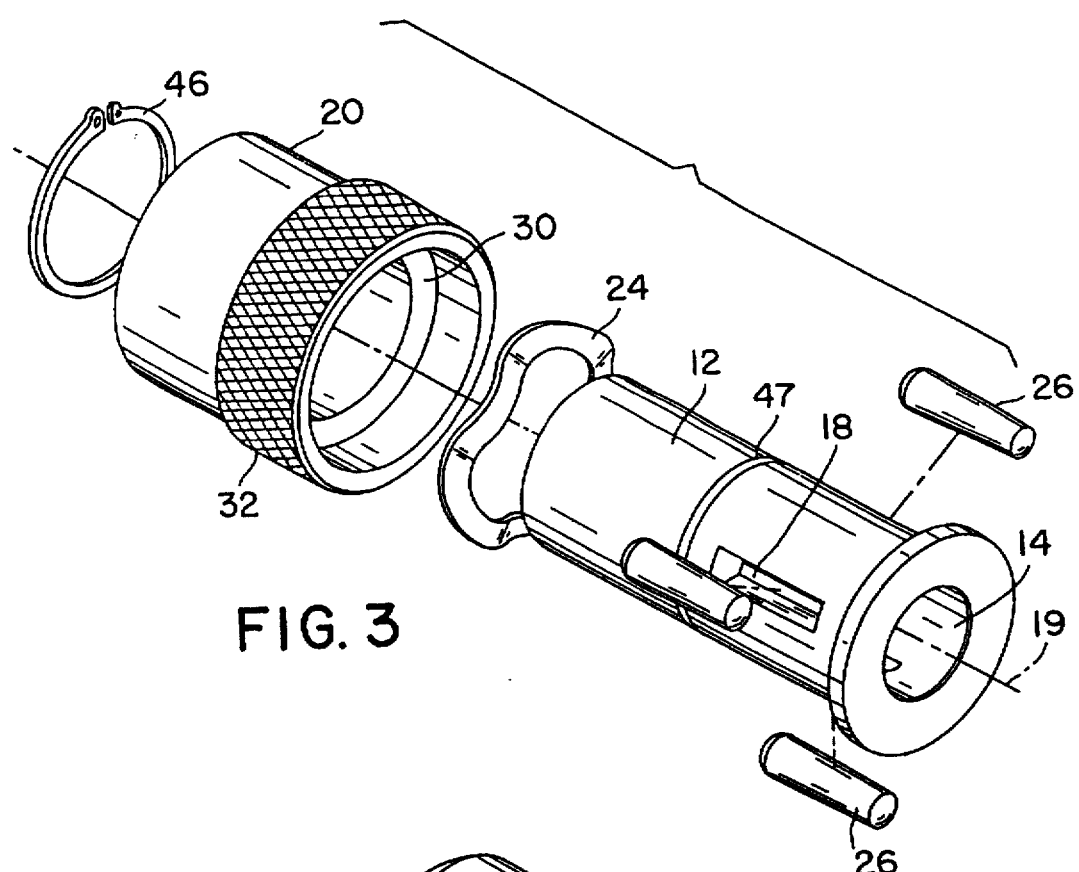
FIG. 3 is an in-line component view of the device according to the invention.

As shown in FIG. 3 for example, body member 12 further includes a plurality of tapered slots 18 formed therein. Slots 18 open into a recess or internal passage 14 defined through body member 12. Recess or passage 14 is sized so as to accommodate a round tool shank 16 (FIGS. 1 and 2) of a tool bit intended to be inserted into device 10, as illustrated generally in the Figures. Slots 18 open into recess 14 through a longitudinal opening 48, as particularly shown in FIG. 4.

Device 10 further includes a tapered pin 26 seated within each tapered slot 18, as generally illustrated in the Figures. As particularly shown in FIGS. 2 and, pins 26 are seated within slots 18 such that a portion of pin 26 extends into recess 14 through opening 48 along the entire length of pin 26. However, in an alternative embodiment, slots 18 can be configured so as to permit only part of the length of pin 26 to extend into recess 14. Moreover, it should be understood that opening 48 is sized so that a circumferential portion of each pin 26 extends into recess 14 without the smaller or tapered end 27 (FIG. 4) of each pin 26 falling or dropping into recess 14. In other words, opening 48 is wide enough to allow a portion of each pin 26 to extend into recess 14 along the entire length of the pin, but narrow enough to retain the entire pin 26 within slot 18. It should also be understood that, although each pin 26 is tapered in a conical sense, slot 18 defines a relatively flat or horizontal seating surface at the bottom of slot 18 in which opening 48 is defined such that the portion of pin 26 which extends through slot 48 lies in a plane essentially parallel to a centerline axis 19 (FIG. 3) through body member 12.

Figure 4:
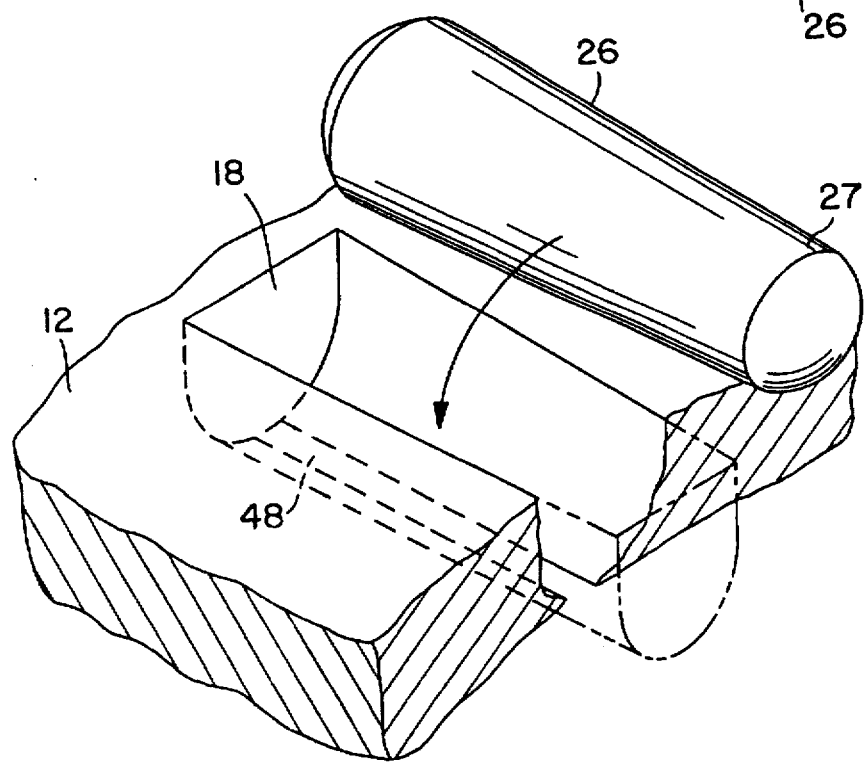
FIG. 4 is an exploded view of a tapered slot defined in the body member of the quick-change chuck device and matching tapered pin.
Figure 10:
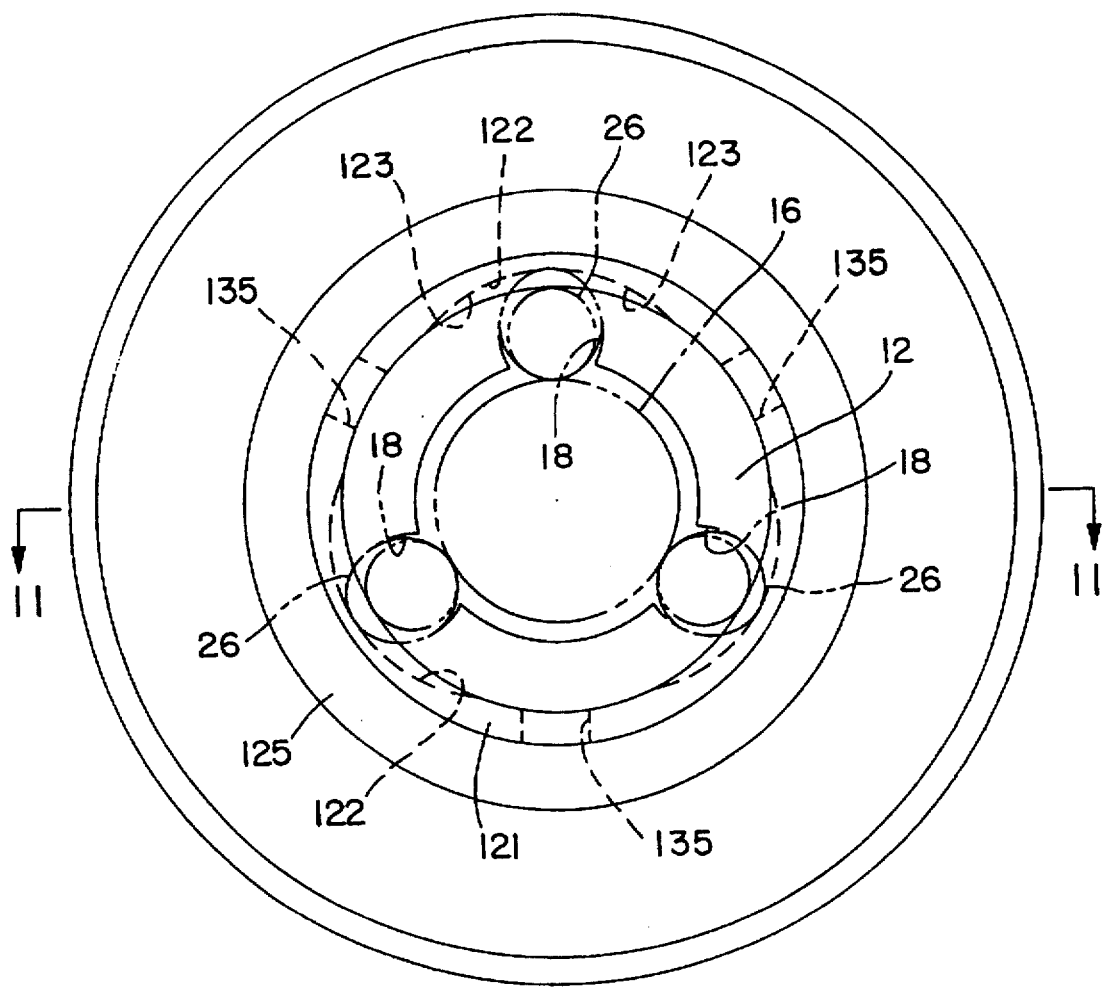
FIG. 10 is a front plan view of an alternative embodiment of the quick-release chuck device incorporating the slit sleeve member embodiment of FIGS. 8 and 9 and showing the tool shank and features of the sleeve member in phantom.

Sleeve member 20, 120 further includes tapered pin engaging surfaces for contacting and forcing pins 26 radially inward in the biased position of sleeve 20, 120, as illustrated in FIGS. 2, 4 and 10 for example. The tapered pin engaging surfaces are preferably formed as radiused grooves 22, 122 defined in the inner diameter surface of sleeve member 20, 120. Grooves 22, 122 have a radius which is proportionally greater than that of pins 26 along the entire length of the grooves and thereby essentially define "ramping" sections 23, 123 along the sides of grooves 22, 122, respectively. Thus, grooves 22, 122 do not "lock" pins 26 within slots 18 in the biased position of sleeve member 20, 120, but allow for movement of pins 26 within slots 18, as will be explained more fully below.

In the position illustrated in FIG. 2, tool shank 16 has been inserted within recess 14. Sleeve 20 has been released by the operator and has been forced axially rearward against retaining clip 46 by axial spring mechanism 24. Tapered engaging grooves 22 of sleeve 20 engage the tapered surface of pin 26 and uniformly force pin 26 radially inward. A portion of pin 26 is thus forced through longitudinal opening 48 to engage tool shank 16 in a horizontal or parallel line of contact along the entire length of pin 26. To release tool shank 16 from device 10, an operator simply grasps outer sleeve 20 (or 120) and pulls the sleeve axially forward against the force of spring 24. Thus, the tapered engaging surface 22 (or 122) is moved axially forward and thereby allows pins 26 to move radially outward within slot 18. The operator then simply grasps tool shank 16 and pulls the shank out of device 10.

The relationship of tapered pins 26 and corresponding tapered engaging grooves 22, 122 cause tool shank 16 to be locked in both the axial and radial direction within device 10. In the embodiment illustrated in FIG. 2, tool shank 16 is axially seated against the rear face 17 of recess 14, and thus axial movement of tool shank 16 towards device 10 is prevented. In an alternative embodiment not illustrated, recess 14 may not have a rear face 17 but may be in direct communication with threaded bore 38. The taper or "gripping" angle of pins 26 and grooves 22, 122 is generally less than eight degrees, and preferably between two and six degrees, so as to maximize the gripping forces between such tapered surfaces. Applicant has found that a taper range of between two and six degrees provides sufficient axial gripping forces in the high rotational speed applications of device 10, such as with routers. Additionally, any motion or force tending to draw tool shank 16 out of device 10 generally tends to force tapered pins 26 against engaging surface 22, 122, thereby causing pins 26 to further "wedge" against shank portion 16. Thus, forward axial movement of shank 16 is prevented.

It is believed that rotational movement of shank 16 relative to device 10 is prevented due to the unique configuration of pins 26, grooves 22 (or 122), and slots 18. Rotational forces exerted on tapered pins 26 seated within slot 18 from rotation of tool shank 16 cause pins 26 to tend to move or "roll" to a slight degree within slots 18 circumferentially about tool shank 16 and to wedge and lock against the ramping sections 23, 123 of grooves 22, 122, respectively. In addition, referring particularly to FIG. 2, since the line of contact of pins 26 against shank 16 is essentially parallel to the longitudinal centerline 19 through device 10, pins 26 are not free to rotate about their axis and any rotational movement imparted to pins 26 from tool shank 16 causes the pins to tend to pivot within slots 18 as they rotate, similar to the rolling movement of a cone against a flat surface. This pivoting movement tends to cause pins 26 to become canted within slots 18 such that the opposite end edges of pins 26 wedge against ramping sections 23, 123 of grooves 22, 122, respectively, preventing further rotational movement of pins 26, as particularly shown in FIG. 4.

In the alternative embodiment of the outer sleeve member 120 shown in FIGS. 8-11, adjacent and spaced apart from each inner diameter pin engaging surface 122 of the outer sleeve member 120, there is disposed an axially extending, elongated slit 135. Moreover, each such slit 135 can be defined through a cylindrical steel insert 121 that is press fitted into a polymer sleeve 125, which is coaxial about the insert 121. The polymer sleeve 125 has less mass than a metal sleeve of the same dimensions and is easier to grasp manually. Moreover, the polymer sleeve 125 is more aesthetically pleasing than a metal sleeve with elongated slits. The cylindrical insert 121 is configured to be coaxial about the body member 12, and insert 121 and polymer sleeve 125 are together axially moveable relative to the body member 12.

In accordance with this slit sleeve embodiment of the present invention, which is especially suited for controlling the stress level between the pins 26, the tool shank 16 and the outer sleeve, the outer sleeve 120 is rendered more flexible by combining polymer sleeve 125 with a relatively thin steel insert 121 having at least one elongated, axially extending slit 135. As shown in FIG. 10 for example, the interior surface of cylindrical insert 121 is provided with a plurality of separate pin engaging surfaces in the form of tapered grooves 122, each one disposed to oppose a separate one of the tapered slots 18 defined in the body member 12. Each pin engaging surface 122 is longitudinally tapered, and each two pin engaging surfaces 122 are separated by an elongated slit 135 (shown in dashed line in FIG. 10), which extends axially forwardly and terminates in a relief opening 137.

In applications involving lock-up of the shanks of tool bits, it can become difficult to withdraw the tool from the chuck. It is believed that pins 26 and the shank 16 of the tool bit can undergo a mutual elastic deformation. Once they become so deformed together, it can become difficult to disengage pins 26 from shank 16 in order to release the shank from the chuck and withdraw the tool bit.

Figure 8:
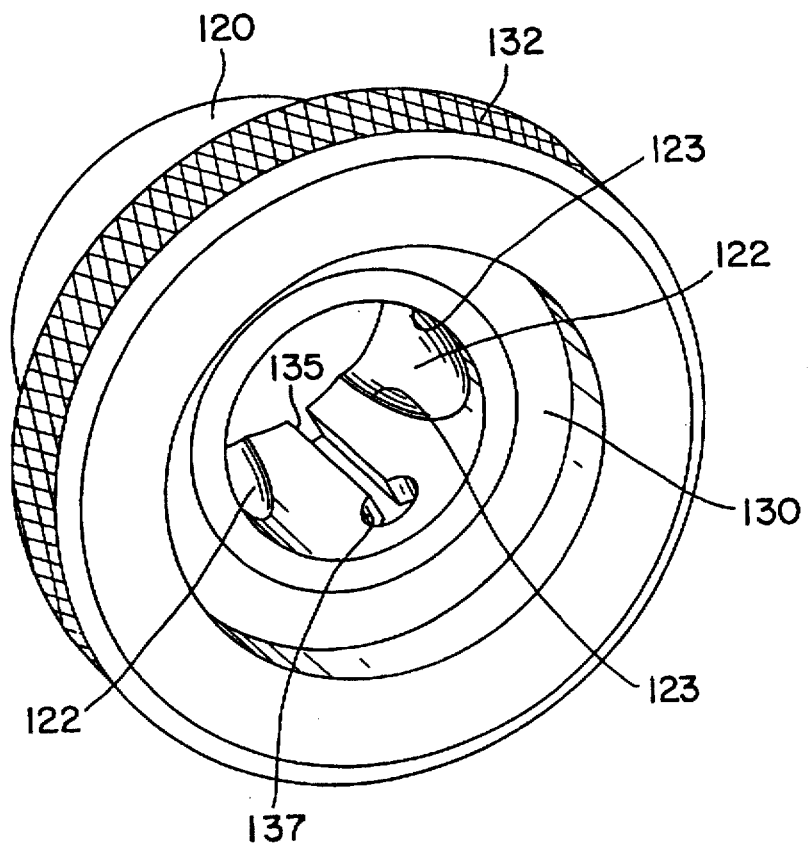
FIG. 8 is an elevated perspective view of an alternative embodiment of the sleeve member of the present invention.
Figure 11:
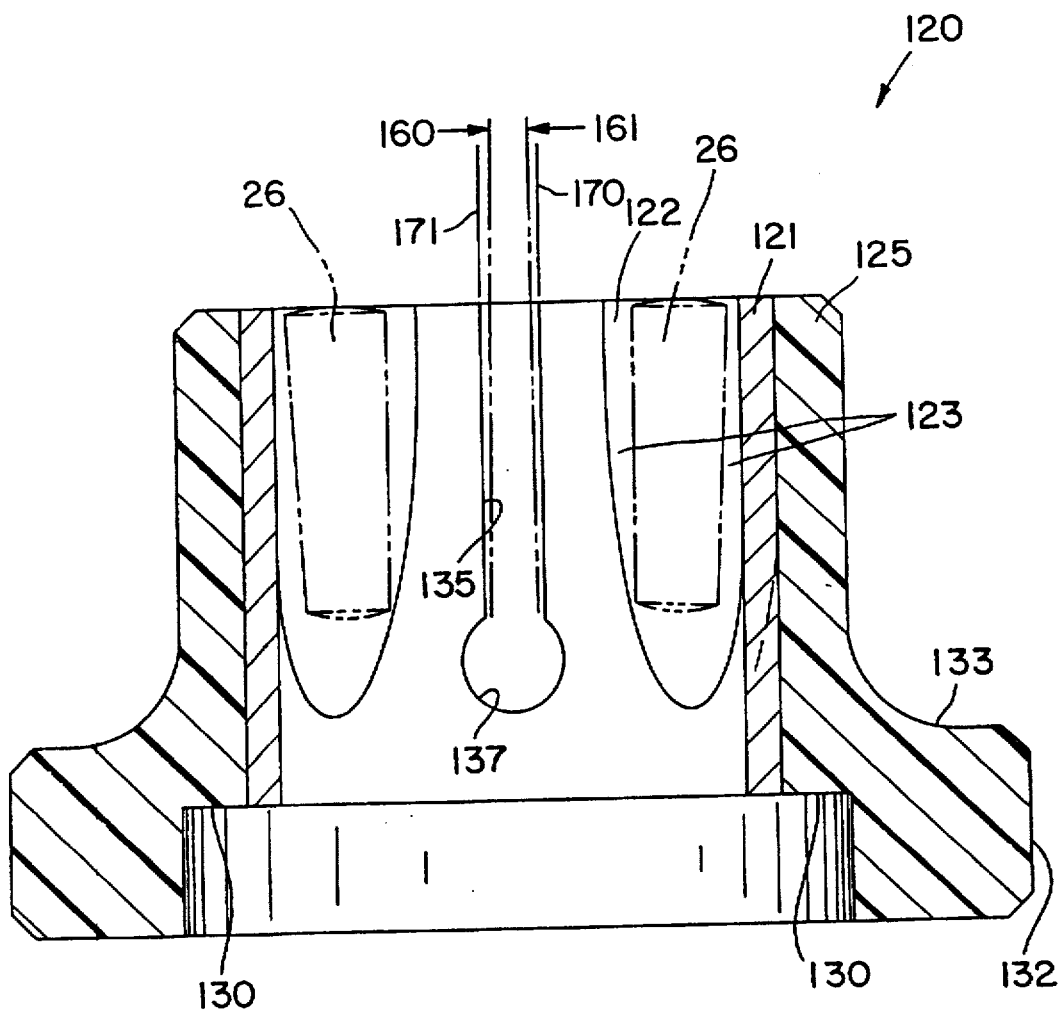
FIG. 11 is a cross-sectional view taken as if along the lines 11—11 in FIG. 10 but showing the pins and an unstressed configuration of the slit in phantom and omitting the body member in order to show features of the slit outer sleeve member with greater clarity.

In accordance with the present invention, the outer sleeve 120 is rendered sufficiently flexible to permit the operator to cause the outer sleeve to expand slightly to release the shank when the operator desires to withdraw the tool from the chuck. The flexibility of the insert 121, and accordingly the outer sleeve 120, is controlled by the radial thickness of the insert 121, the circumferential width of the slit 135, the length of the slit 135 and the type of steel forming the insert 121, including the hardness of the steel. Such hardness is affected by the heat treat quality of the steel insert 121, which must be configured and heat treated to maintain sufficient rigidity to hold the tool shank during operation of the chuck device. When the chuck holds the shank 16 of a tool and the operator causes the polymer sleeve 125 and insert 121 to move axially relative to the body member 12, the tapered pins 26 pressing against the pin engaging surfaces 122 of the insert 121 cause the diameter of the insert 121 to increase in the vicinity of contact with pins 26. The slits 135 accommodate this local increase in diameter by expanding in the circumferential direction, thereby aiding release of the shank 16 of the tool. As schematically shown in FIG. 11, the circumferential width of each slit 135 expands from the dashed lines designated 160, 161 to the solid lines designated 170, 171. Moreover, as shown in FIGS. 8, 9 and 11 for example, the effectiveness of slits 135 is further enhanced by providing a stress relief opening 137 disposed in communication with the forward end of each axially extending, elongated slit 135.

Although not illustrated in the Figs., it may be preferred to provide a rotational position locking or alignment device, such as a conventional locking key and recess, between sleeve member 20, 120 and body member 12 to maintain grooves 22, 122 opposite slots 18 when a tool shank is not held within device 10. Alternatively, a marking system could be utilized to allow the operator to align the grooves 22, 122 and slots 18 before inserting a tool into the device.

Figure 7A:
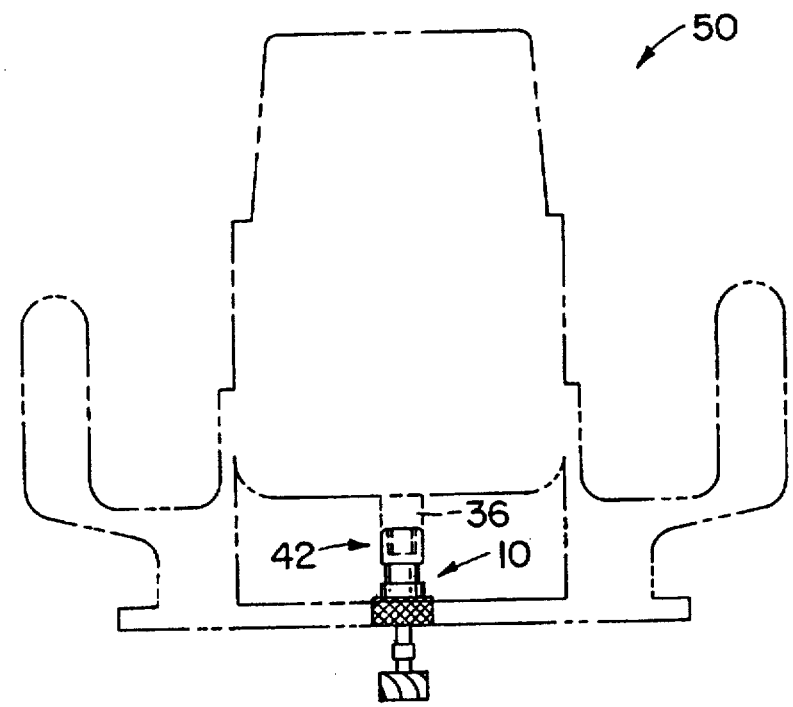
FIGS. 7A and 7B are diagrammatic views of a machine tool, such as a router, incorporating the quick-change chuck device according to the invention.
Figure 7B:
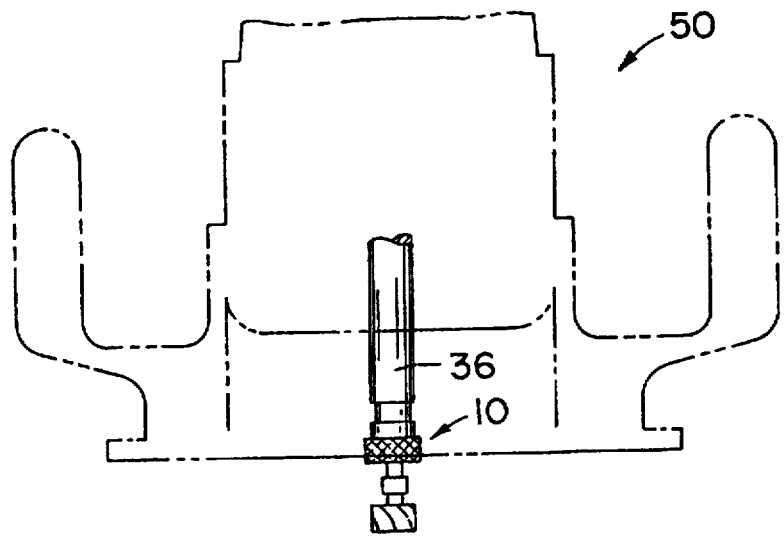

The present invention also encompasses any conventional machine tool configured for driving a tool bit which utilizes the quick-change chuck device discussed above. For example, referring to FIGS. 7A and 7B, a conventional machine tool 50 is illustrated in diagrammatic form. Machine tool 50 may comprise a router, such as illustrated, or any manner of machine tool such as a laminate trimmer, or any machine tool wherein it is desired to utilize a quick-change chuck device 10 as described above. In the embodiment of FIG. 7A, device 10 is mated with drive spindle 36 of tool 50 through an appropriate locking mechanism 42, such as the threaded engagement devices or socket devices discussed above. In the embodiment of FIG. 7B, device 10 is formed integral with drive spindle 36.

The present invention is suited for any manner of machine tool wherein a tool bit must be rotationally driven. The device is particularly suited for applications such as routers and laminate trimmers wherein relatively great rotational speeds are desired. However, this is in no means a limitation of the invention. In fact, it will be apparent to those skilled in the art that various modifications and variations can be made in the apparatus of the present invention without departing from the scope or spirit of the present invention. Thus, it is intended that the present invention cover the modifications and variations of this invention provided they come within the scope of the appended claims and their equivalents.

What is claimed is:

1. A quick-change chuck device, comprising:
 a body member having a recess defined therein for receipt of a circular tool shank, said body member further comprising at least one tapered slot defined therein in communication with said recess;
 an outer sleeve member coaxial about said body member and axially movable relative to said body member, said outer sleeve member further comprising at least one inner diameter pin engaging surface;
 an axial spring mechanism disposed relative to said sleeve member and said body member so as to bias said sleeve member longitudinally relative to said body member to a biased position, said sleeve member axially movable against the biasing force of said spring mechanism to a released position; and at least one tapered pin seated within said at least one tapered slot, said at least one tapered pin contacting said at least one outer sleeve pin engaging surface and thereby being forced radially inward within said slot so as to extend into said recess in said biased position of said outer sleeve, said pin being movable radially outward within said slot in said released position of said outer sleeve.

2. The device as in claim 1, wherein said body member further comprises a flange surface and said outer sleeve comprises a seat, said spring mechanism operably disposed between said flange and said seat.

3. The device as in claim 2, wherein said outer sleeve member is biased axially rearward relative to said body member by said spring mechanism and comprises an outer circumferential surface for grasping by an operator to move said outer sleeve member axially forward to said released position.

4. The device as in claim 2, wherein said outer sleeve member is biased axially forward relative to said body member by said spring mechanism and comprises an outer circumferential surface for grasping by an operator to move said outer sleeve member axially rearward to said released position.

5. The device as in claim 1, further comprising an engagement device for operably connecting said device to a drive spindle.

6. The device as in claim 5, wherein said body member comprises a female threaded receiving portion at an end thereof for threaded engagement with a male threaded driving spindle.

7. The device as in claim 5, wherein said body member comprises a male threaded engaging portion at an end thereof for threaded engagement with a female threaded receiving portion of a driving spindle.

8. The device as in claim 5, wherein said engagement device comprises a locking device for locking said body member within a receiving socket of a driving spindle.

9. The device as in claim 1, wherein said body member comprises a driving spindle of a tool.

10. The device as in claim 1, wherein said outer sleeve member further comprises a grip enhancing outer circumferential surface.

11. The device as in claim 1, further comprising a retaining ring disposed about said body member limiting rearward movement of said outer sleeve member relative to said body member.

12. The device as in claim 1, wherein said at least one tapered slot is tapered in the longitudinal direction and further defines a longitudinally extending opening into said recess having dimensions such that a portion of said at least one tapered pin extends into said recess along the entire length of said pin defining a line contact between said pin and a tool shank inserted into said recess.

13. The device as in claim 12, wherein said at least one outer sleeve pin engaging surface comprises a longitudinally extending radiused groove defined in said outer sleeve member, said groove being tapered to an angle essentially equal to the taper angle of said tapered pin, said portion of said pin defining said line contact moving essentially parallel to a centerline axis through said recess.

14. The device as in claim 13, wherein said radiused groove further comprises a radius which is proportionally greater than that of said tapered pin along the length of said pin and thereby defining a ramping section in said groove along the longitudinal sides of said pin.

15. The device as in claim 1, wherein said outer sleeve member further comprising an axially extending, elongated slit disposed adjacent and spaced apart from said inner diameter pin engaging surface.

16. The device as in claim 1, wherein said outer sleeve member further comprising a cylindrical insert member having an interior surface including said inner diameter pin engaging surface.

17. The device as in claim 16, wherein said cylindrical insert member further comprising an axially extending, elongated slit disposed adjacent and spaced apart from said inner diameter pin engaging surface.

18. The device as in claim 16, further comprising a polymer sleeve coaxial about said cylindrical insert member.

19. The device as in claim 16, wherein said cylindrical insert member further comprising a stress relief opening disposed in communication with one end of said axially extending, elongated slit.

20. A quick-change chuck device, comprising:

a body member having a recess defined therein for receipt of a circular tool shank, said body member further comprising a plurality of tapered slots defined therein in communication with said recess, each said tapered slot being tapered in the longitudinal direction and further defining a longitudinally extending opening into said recess;

an outer sleeve member coaxial about said body member and axially movable relative to said body member, said body member further comprising a plurality of inner diameter pin engaging surfaces;

an axial spring mechanism disposed relative to said sleeve member and said body member so as to bias said sleeve member longitudinally relative to said body member to a biased position, said sleeve member axially movable against the biasing force of said spring mechanism to a released position;

a plurality of tapered pins, each said tapered pin seated within a different one of said tapered slots, each said longitudinally extending opening in each said slot having dimensions such that a portion of each said tapered pin extends into said recess along the entire length of said pin defining a line contact between each said pin and a tool shank inserted into recess in said biased position of said outer sleeve member; and each said outer sleeve pin engaging surface being tapered to such a degree so as force one of said tapered pins uniformly radially inward upon said outer sleeve moving to said biased position such that said portion of each said pin defining said line contact moves essentially parallel to a centerline axis through said recess.

21. A machine tool configured for driving a tool bit, said machine tool comprising:

a drivable spindle a quick-change chuck device, said chuck device further comprising:

a body member having a recess defined therein for receipt of a circular tool shank, said body member further comprising at least one tapered slot defined therein in communication with said recess;

an outer sleeve member coaxial about said body member and axially movable relative to said body member, said outer sleeve member further comprising at least one inner diameter pin engaging surface;

an axial spring mechanism disposed relative to said sleeve member and said body member so as to bias said sleeve member longitudinally relative to said body member to a biased position, said sleeve member axially movable against the biasing force of said spring mechanism to a released position; and at least one tapered pin seated within said at least one tapered slot, said at least one tapered pin contacting said at least one outer sleeve pin engaging surface and thereby being forced radially inward within said slot so as to extend into said recess in said biased position of said outer sleeve, said pin being movable radially outward within said slot in said released position of said outer sleeve.

22. The machine tool as in claim 21, wherein said machine tool comprises a router.

23. The machine tool as in claim 21, wherein said quick release chuck is threadedly engaged with said spindle.

24. The machine tool as in claim 21, wherein said quick release chuck is releasably fitted into a socket of said spindle.

25. The machine tool as in claim 21, wherein said quick release chuck is formed integral with said spindle.

* * * * *

UNITED STATES PATENT AND TRADEMARK OFFICE
CERTIFICATE OF CORRECTION

PATENT NO. : 5,755,448
DATED : May 26, 1998
INVENTOR(S) : Roger J. Kanaan, et al.

It is certified that error appears in the above-identified patent and that said Letters Patent is hereby corrected as shown below:

On the title page:

Under "Foreign Patent Documents," please change "009908" to --029908--.

Signed and Sealed this

Twenty-eighth Day of December, 1999

Attest:

Q. TODD DICKINSON

*Attesting Officer*  *Acting Commissioner of Patents and Trademarks*